United States Patent [19]

Sassi

[11] Patent Number: 5,359,926

[45] Date of Patent: Nov. 1, 1994

[54] ROTARY PULPING MACHINE FOR EXTRACTING FRUIT AND VEGETABLE JUICES

[75] Inventor: Carlo Sassi, 43100 Parma, Italy

[73] Assignee: Metro International S.R.L., Parma, Italy

[21] Appl. No.: 86,551

[22] Filed: Jul. 1, 1993

[30] Foreign Application Priority Data

Jul. 29, 1992 [IT] Italy ............................ PR92A000032

[51] Int. Cl.⁵ .............................................. A23N 1/00
[52] U.S. Cl. ........................................ 99/510; 99/495; 99/513; 241/282.1
[58] Field of Search ............................ 99/495, 501–505, 99/509–513; 366/314; 241/92, 282.1; 426/431, 600; 100/117, 145

[56] References Cited

U.S. PATENT DOCUMENTS

| | | | |
|---|---|---|---|
| 1,290,732 | 1/1919 | Gants et al. ............................ | 99/513 |
| 1,356,199 | 10/1920 | Falcone ................................. | 99/513 |
| 2,478,651 | 8/1949 | Blachere ............................... | 99/513 |
| 2,541,264 | 2/1951 | McGihon .............................. | 99/513 |
| 2,785,719 | 3/1957 | Dufault et al. ..................... | 99/511 X |
| 2,994,105 | 8/1961 | Seal et al. ........................... | 99/495 X |
| 4,095,517 | 6/1978 | Janovtchik ............................ | 99/495 |
| 4,490,335 | 12/1984 | Marev et al. ..................... | 426/431 X |
| 4,522,119 | 6/1985 | Finch et al. ....................... | 100/117 X |
| 4,688,478 | 8/1987 | Williams ........................ | 241/282.1 X |
| 4,774,097 | 9/1988 | Bushman et al. .................. | 99/495 X |

FOREIGN PATENT DOCUMENTS

| | | | |
|---|---|---|---|
| 487113 | 2/1976 | U.S.S.R. ............................... | 99/511 |
| 0707565 | 1/1980 | U.S.S.R. ............................... | 99/513 |

*Primary Examiner*—Timothy F. Simone
*Attorney, Agent, or Firm*—Laff, Whitesel, Conte & Saret, Ltd.

[57] ABSTRACT

The invention relates to the field of fruit and vegetable juice and purée extractors in general. More precisely, it relates to a rotary-type extractor having at least two refinement stages arranged vertically and coaxially and being activated by a single, common motorization.

8 Claims, 2 Drawing Sheets

ROTARY PULPING MACHINE FOR EXTRACTING FRUIT AND VEGETABLE JUICES

BACKGROUND OF THE INVENTION

The invention relates to a rotary pulping machine for the extraction of fruit and vegetable juices and purées.

The prior art for the extraction of juices and purée envisages the use of single-or multi-stage extractors of the rotary type.

Such extractors generally comprise a rotor with radial blades which impresses centrifugal forces on the product sufficient to cause the product to pass through a sieve of the cylindrical or conical type, made in perforated sheet steel and surrounding the rotor, and thereafter to be collected externally, while the bits or waste stay inside the sieve and can be removed separately through a special waste discharge outlet.

Where a rather high degree of product refinement is required, eliminating solid impurities larger than a prefixed qualititive standard permits, a first known regulating modality is that of placing two or three extracting machines in series in order to create several extracting stages, with a consequent increase in costs and constructional complexity since in effect the single extractor is doubled or tripled in number, together with its relative motorization.

A second realisation, more often adopted since more economical, envisages the use of one single-stage extractor which performance is increased by increasing the rotation velocity of the rotor, increasing in turn the rotor rotation speed and proportionally the centrifugal forces bearing on the product, or reducing the distance between the rotor blades and the internal surface of the sieve.

With higher rotation velocities, however, the risk of sieve breakage is also increased, since the latter is subject to constant stress, the final result being that the entire machine is less reliable. The sieves used usually have a breadth which is equal to the diameter of the holes, so it is obvious that if a single sieve with very small perforations is used, to allow through only the most refined product, the breadth of that sieve will have to be rather small and thus subject to possible breakage.

This problem is resolved in various-stage extractors by the use of several sieves having breadth and perforation diameters which decrease in cascade, in such a way that the final sieves with fine perforations undergo stress which is inferior to that of the above since the said sieves are in contact with a product that has already been partially refined.

In single-stage machines, the necessary increase in the rotation speed of the rotor and the consequently greater centrifugal forces impressed lead to the fragmentation of the bits (seed fragments, peel), with their subsequent possible passage through the sieve perforations and an ensuing drop in the quality of the final product.

SUMMARY OF THE INVENTION

An aim of the present invention is that of eliminating the above-mentioned drawbacks by providing a machine having the characteristics and technical advantages of multi-stage machines at a cost which is comparable to that of a simple single-stage machine.

In particular, one of the aims of the invention is to provide a particularly reliable machine which is able to produce juices and purées of the highest quality with lower production costs than those of a conventional multi-stage machine.

The said aims are fully attained by our rotary pulping machine for the extraction of fruit and vegetable juices and purées. The pulping machine is of the type that has a first extraction stage. The pulping machine has a rotor which central rotation shaft equipped with blades aimed at moving the introduced product and impressing a centrifugal effect on it;

a first stage sieve of cylindrical or conical shape, through which liquid extracted from the centrifuged product passes;

separate outlets for the waste materials remaining inside the sieve and for the juice or refined part of the product which has passed throught the sieve;

motorization means to rotate the rotor central rotation shaft at least a second refinement stage, coaxial to the first extraction stage activated by the same motorization means, each of which the second refinement stages comprising a second bladed rotor applied to the common central rotation shaft, and a refinement sieve.

BRIEF DESCRIPTION OF THE DRAWINGS

These and other characteristics and advantages of the present invention will better emerge from the detailed description that follows, of an embodiment of the invention, herein illustrated purely in the form of a non-limiting example in the accompanying figures, in which.

DESCRIPTION OF THE PREFERRED EMBODIMENTS

Figure 1:
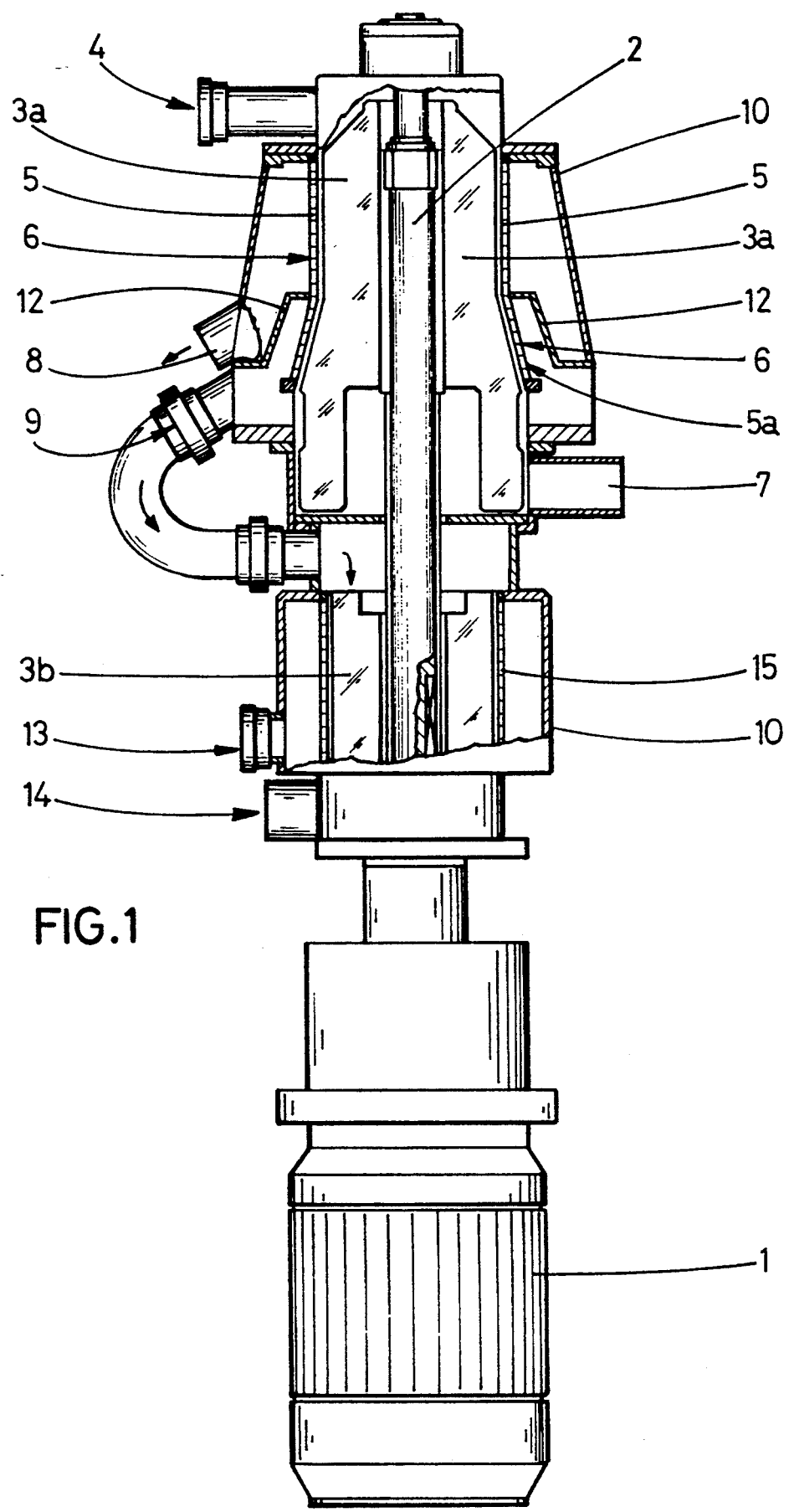
FIG. 1 shows the machine schematically in vertical median section.

With reference to the figures, 1 denotes in its entirety a motorization which rotates a single, vertically-arranged central shaft 2. The central shaft 2 has at least two series of blades 3 attached thereto.

The central shaft 2 is part of a rotary pulping machine for the extraction of vegetable juices and purées housing a first series of blades 3a relative to a first stage of the machine, and a second series of blades 3b of a second stage, arranged in a cascade below the preceding stage. The blades 3a and 3b, rotating solidly to the central shaft 2, constitute two bladed rotors, in which the rotor of the first stage has preferably a greater number of blades (for example, eight), than those of the second stage (for example, four).

The machine has a superiorly or upper inlet 4 for the product which is fed to the machine. The product descends by force of gravity into the zone of the blades 3a from which the said product receives centrifugal movement and is forced against the internal wall of a sieve 5. The sieve 5 is made of perforated sheet steel.

The sieve 5, as is shown in FIG. 1, has a superior or upper cylindrical shape, connected to an underlying downwards-opening conical part 5a.

The liquid part of the product passes externally through a plurality of perforations 6 in the sieve 5, and can be collected separately with respect to the bits or waste product, which remain inside the sieve 5.

A waste discharge outlet 7 is provided for the removal of the waste product left on the bottom of the sieve 5. Two juice or purée outlets 8 and 9 are provided for the juice which has passed through the sieve 5.

The first extraction stage is actually separated into two distinct sections, by means of an extractable or removable crown 12 arranged externally to the sieve 5, in the hollow space between the sieve 5 and an outside protection cover 10 of the machine, in the connection zone between the cylindrical part and the conical part of the sieve 5.

The outlet 8 is for the purest, while denser juice exits through the outlet 9 which has undergone greater centrifugal and mechanical forces due both to the larger diameter of the conical part of the sieve 5 with repsect to the cylindrical part, and to the greater time the product spends inside the machine.

The crown 12, is made for example with two half-rings, and is provided with fixing means to permit its easy extraction or removal from the machine where a first stage with only a single extraction section is desired.

Figure 3:
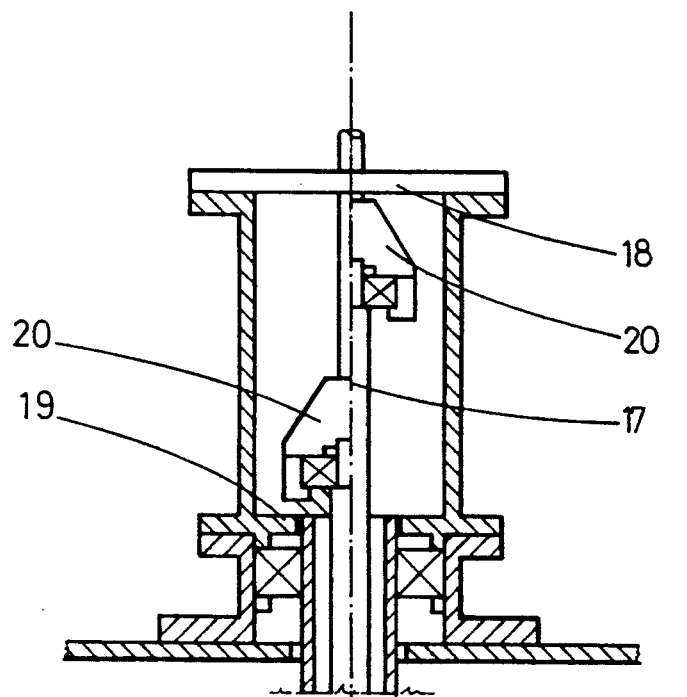
FIG. 3 shows in plan view a detail of a possible blade arragement about a rotor.
Figure 3:
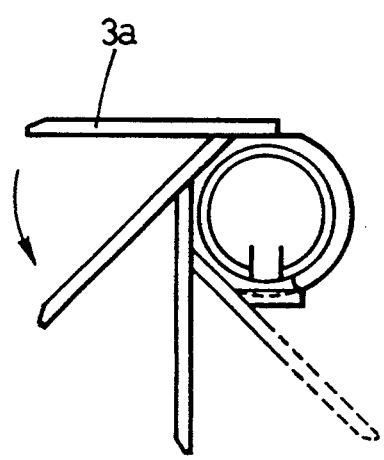

The blades 3a can be of conventional radial type or may be as illustrated in FIG. 3, where the blades 3a form among themselves angles of about 45 degrees, if arranged tangentially to the sides of a regular octagon (seen in plan view) solid to the central shaft 2, but may also form among themselves different angles according to the number of side of the reference polygon.

The shape of the rotor and the angular arrangement of the blades of the first stage may however vary according to the lightening degree desired for the centrifugal effect, depending on whether quality or production is given precedence, while the rotor of the second stage generally has radial blades. The outlet 9, as illustrated in FIG. 1, brings the juice into the second refinement stage where it is subjected to the forces of the further bladed rotor which forces it against a sieve 15 before sending it, through an outlet pipe 13, to a further stage, or to a collection tank of the finished juice.

Also in this last case an outlet 14 is provided for the separate collection of the waste products from the second refinement stage. This waste is obviously finer than that produced by the first stage.

As regards the arrangement of the blades 3b, they are preferably radial and substantially rectangular in shape, and are mounted on the central shaft 2.

According to an alternative embodiment of the invention which is not illustrated, the first-produced, finest juice, can be sent on to the second stage while the denser juice can be used for other purposes.

Figure 2:
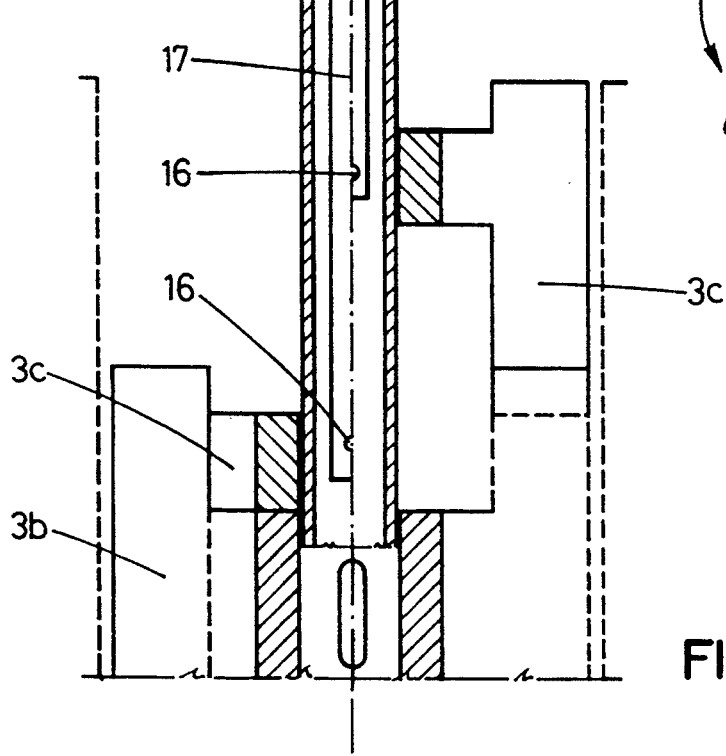
FIG. 2 shows, in vertical section, a detail of the second refinement stage of the machine, in two different operative configurations.

Concerning the regulation of the degree of pulping obtainable with the first stage of the machine of the invention, it is obtained through the use of a frequency converter, not illustrated, which permits of varying the rotation velocity of the rotor.

Where it is necessary to effect an autonomous regulation of the second refinement stage, the second stage rotor is made in the way illustrated in FIG. 2, where it is equipped with blades whose position along the rotor shaft can be varied in height from the outside, hands-off, even while the machine is functioning.

The rotor is provided with a series of fixed lower blades 3b and a second series of blades 3c, displaced with regard to the preceding ones and solid or fixed to a radial pivot 16 of a slidable spindle 17 internal to the said central shaft 2.

The vertical translation of the spindle 17 is effected by means of a ratiomotor with wormscrew or by means of a pneumatic cylinder, both not illustrated.

The spindle 17 with pivots 16 constitute means to regulate the position of the blades 3c along the central shaft 2.

On the left is the lower position, the position of minimum use of the sieve, while on the right the blades 3c are represented in their upper position, that of maximum use of the sieve 15.

The vertical movement of the blades 3c is limited by the presence of an upper endrun 18 and a lower endrun 19 against which a head 20 of the spindle 17 interferes.

What is claimed is:

1. A rotary pulping machine for extracting fruit and vegetable juices and purées wherein the pulping machine is of the type which includes a first extraction stage comprising:
    a rotor having a central rotation shaft equipped with blades to move an introduced product and to provide a centrifugal effect on said product;
    a first stage sieve of cylindrical or conical shape, through which liquid is extracted from a centrifuged product passes;
    separate outlets for waste materials remaining inside the first stage sieve and for juice or refined part of the product which has passed through the first stage sieve;
    motorization means to rotate the central rotation shaft, at least a second refinement stage coaxial to the first extraction stage, said motorization means connected to both said first extraction stage and said second refinement stage, each of said second refinement stages comprising a second bladed rotor on said central rotation shaft, a refinement sieve, and a first extraction stage outlet connected to a second refinement stage inlet.

2. A machine as in claim 1, wherein the central rotation shaft is vertically arranged.

3. A machine as in claim 1, wherein the first extraction stage has a first bladed rotor and comprises an extractable crown arranged externally to the first stage sieve and constituting a separation wall defining a first and second section, said first section being an upper section to collect fine juice exiting from an upper zone of the first stage sieve, and said second section being a lower section for denser juice to collect denser juice exiting from a lower zone of said first stage sieve and said denser juice being subjected for a longer period to centrifugal forces provided by said rotor.

4. A machine as in claim 3, wherein the crown is composed of two half-rings and is equipped with means enabling said crown to be removably attached to the machine.

5. A machine as in claim 1, wherein the first stage sieve has a superior cylindrical shape and an inferior conical shape, said conical shape having a greatest diameter at a bottom to transmit to the product a centrifugal force which increases during a descending course of said product.

6. A machine as in claim 3, wherein the first extraction stage comprises two different outlet, one outlet connected to the upper zone of the first stage sieve to collect fine juice or puree from the first stage sieve and the other outlet connected to the lower zone of the first stage sieve to collect denser product.

7. A machine as in claim 1, wherein the second refinement stage comprises offset blades offset with respect to fixed blades, said offset blades being equipped with regulating means for positioning the offset blades along the central rotation shaft to provide regulation of a degree of pulping in said second refinement stage.

8. A machine as in claim 7, wherein the regulation means comprises a spindle which translates vertically and is positioned internally to said central rotation shaft, said spindle being equipped with one or more radial pivots projecting from the spindle and said offset blades attached to said pivots.

* * * * *